United States Patent [19]

Brueggemann et al.

[11] Patent Number: 5,192,930
[45] Date of Patent: Mar. 9, 1993

[54] F.E.T. FLASHER

[76] Inventors: Douglas C. Brueggemann, 745 Flamingo Dr., W. Palm Beach, Fla. 33401; Norman R. Dittmar, 525 5th Ave. N.W., Rochester, Minn. 55901-2840

[21] Appl. No.: 813,680

[22] Filed: Dec. 26, 1991

Related U.S. Application Data

[63] Continuation-in-part of Ser. No. 656,487, Feb. 15, 1992, abandoned.

[51] Int. Cl.⁵ .............................................. B60Q 1/40
[52] U.S. Cl. .................................... 340/477; 340/475
[58] Field of Search ............... 340/477, 475, 309.15, 340/331; 315/77, 200 A

[56] References Cited

U.S. PATENT DOCUMENTS

| 4,254,397 | 3/1981 | Shannon | 340/477 |
| 4,792,785 | 12/1988 | Yukio et al. | 340/477 X |
| 4,816,818 | 3/1989 | Roller | 340/475 |
| 4,893,111 | 1/1990 | Roller | 340/475 X |
| 4,972,174 | 11/1990 | Onan et al. | 340/477 |

FOREIGN PATENT DOCUMENTS

| 2827212 | 1/1980 | Fed. Rep. of Germany | 340/477 |
| 2084413 | 4/1982 | United Kingdom | 340/477 |
| 2104738 | 3/1983 | United Kingdom | 340/477 |

Primary Examiner—Jin F. Ng
Assistant Examiner—Christine K. Oda

[57] ABSTRACT

An electronic flasher switch, for use in vehicular signalling systems. The flasher features automatic timeout and an audio oscillator for timing and for optional audio signalling to supplement interior turn signal dash indicator lights. A single integrated circuit and two small capacitors allow compact, low cost implementation.

5 Claims, 1 Drawing Sheet

F.E.T. FLASHER

This application is a continuation-in-part of Ser. No. 07/656,487, filed Feb. 15, 1992 now abandoned.

References Cited: below show the state of the art

U.S. PATENT DOCUMENTS

U.S. Pat. No. 3,218,415

U.S. Pat. No. 4,254,397, Mar. 3, 1981, Brian Shannon

U.S. Pat. No. 4,290,048, Sep. 15, 1981, D. and J. Cutlip

U.S. Pat. No. 4,302,748, Nov. 24, 1981, L. A. Gant,

U.S. Pat. No. 4,792,785, Dec. 20, 1988, Yukio, et al.

FOREIGN PATENT DOCUMENTS

UK No. 2084413, Apr. 7, 1982, Pat. Off., 25 Southampton Bldgs. London WC2A 1AY, R. H. Orton, et al, inventors.

UK No. 2,104,738A, Mar. 9, 1983, Ibid., Peter W. Neville, inventor.

Ger. No. 28 27 212, Oct. 1, 1980. DeutschesPatentamt, Dieter Meyer, inventor.

OTHER PUBLICATIONS

COS/MOS Integrated Circuits Databook, RCA Corp., Somerville, N.J., pp. 631, 632 (or ICAN 6466), 1980.

1970 Ford Truck Shop Manual, Ford Motor Co., Dearborn, MI, Nov. 1969, pp. 32-04-02,3.

BACKGROUND OF THE INVENTION

Ever since the invention of the incandescent lamp in 1879 and the direct current charging system, ca. 1900, such lamps have been used in motor vehicles for signalling. Later automatic flasher switches were invented and applied in turn signalling systems. One such flasher is documented in U.S. Pat. No. 3,218,415. Flasher switches are hereinafter referred to as "flashers".

A typical automotive exterior signalling system of the prior art comprises a battery for direct current (d.c.) electricity having a positive terminal and a connection to system ground, a steering column mounted turn signal switch having left detent, Off, and Right detent positions, front and rear, left and right signalling lamps, a signal flasher which causes the blinking of the turn signalling lamps, and a turn signal switch cancelling mechanism.

A flasher of the prior art is a two terminal thermoelectrical device, which, when connected in series with parallel connected incandescent lamps, will cause the lamps to flash periodically when d.c. is forced through the circuit.

When an operator of said system wants to signal a turn, he moves the turn signal switch to the appropriate detent position. The turn signal switch routes current from the battery through the flasher, and on through the lamps to system ground. For the first ⅜ second (s.) or so after said switching, the lamps are lit (a MARK); thereafter they will be unlit (a SPACE) and lit periodically with a period of approx. 0.8 s., MARK and SPACE lasting 0.4 s. each, until the turn signal switch is moved back to the Off position, at which time the lamps are immediately extinguished.

The commonly used thermoelectric flasher of the prior art has proven adequate but has one shortcoming: If an operator forgets to turn Off the turn signal switch in a situation where the cancelling mechanism does not do it, the turn signal lamps flash indefinitely.

The present invention is an electronic version of the flasher. It has the additional feature of automatically terminating a flashing sequence, if the turn signal switch is left in a detent position for more than a certain fixed interval. This feature is called the "timeout" feature herein; said interval is called the "timeout interval".

Turn signalling systems having the timeout feature have been used for some time on motorcycles, necessary because there is no cancelling switch. Yet, the timeout feature has not been worked into automotive systems, the closest thing so far being an audible alarm which sounds after approx. 40 s. e.g., a 1989 Oldsmobile. This particular scheme has the drawbacks that there are several other sources of alarms, and the alarm has to be very loud to overcome road noise.

The application of motorcycle timeout circuitry to automobiles is not straight forward, because: (a) The turn signal switch on a car differs from that of a motorcycle. (b) It is desirable to retain the mechanical cancelling mechanism in the automotive system, but motorcycles don't have this, and (c) In an automotive system, with each MARK there is a current surge of approx. 30 A. (Amperes) through two standard turn signal lamps wired in parallel. A flasher switch can tolerate this, but a junction transistor which can tolerate this is expensive.

Nonetheless, transistorized flashers have been used, one such being on Ford trucks (except F100), wherein the flasher doubled as a hazard warning flasher. (See 1970 truck shop manual, loc cit).

Electronic flashers of the prior art have accommodated some but not all of the above factors. U.S. Pat. No. 4,254,397 seems not to have addressed the third of these, and it produces a long initial MARK. The circuits of U.S. Pat. Nos. 4,290,048, 4,302,748, and 4,792,785 are intended especially for motorcycles. The first of these employs a relay; the second has three oscillators; the third is intended solely for motorcycles and employs a handlebar angle turning sensor and a traversed-distance transducer.

Two further considerations are cost and size. The common flasher of the prior art costs approx. three dollars, a cost which would be hard to beat with any of the electronic flashers of the prior art, especially those employing junction transistors as the main switching element, such as in U.S. Pat. Nos. 4,254,397, 4,290,048, 4,302,748, 4,792,785, UK 2,104,738A, and UK 2,084,413A. Regarding size, relays and capacitors are components which must be discrete and add considerably to size. Of the above referenced documents, capacitor counts are six, two, six, twelve, four, three, and six, respectively. Relays are specified in U.S. Pat. No. 4,290,048 and Ger. 28 27 212. A magnetically actuated turn signal switch return mechanism is part of the signalling system of U.S. Pat. No. 4,792,785, as part of the prior art with respect to that invention.

SUMMARY OF THE INVENTION

The present invention is an electronic flasher with timeout feature, and it is amenable to replace the flashers of the prior art.

The main objectives of the present invention are to eliminate the danger caused by a turn signal inadvertently left flashing, and to achieve a small, low cost flasher. When embodied as described herein, and installed in a signalling system of the prior art, said system acts just as before, excepting:

1. If the turn signal switch is left in a detent position for a period of time beyond said timeout interval, the lamps stop flashing.
2. If the turn signal switch is moved from a detent position to Off position and back to a detent position, another full timeout interval of flashing is obtained, unless the turn signal switch is forced back to Off position before the expiration of said timeout interval.
3. The first MARK in a sequence is standard length, not longer than subsequent ones, as with those of the prior art.

In order to function as a substitute for the flasher of the prior art, a device was needed for the invention which would detect when the turn signal switch has been actuated. A subcircuit which does this has been discovered and is symbolized by 17 of FIG. 1. When the turn signal is in the left or Right detent position, this circuit produces a logic 1; otherwise, it produces a logic 0.

Secondly, circuitry was needed which performs flashing and timeout functions but is still subject to the turn signal switch, as in the prior art. Such circuitry has been discovered and is symbolized by the remaining circuitry of FIG. 1.

In a turn signalling system for vehicles having a d.c. power source symbolized as 1 of FIG. 1, turn signal switch, represented by switch 4, turn signal lamps, which are represented by 5, an electrically common node, represented by a "ground" symbol wherever it occurs, the invention is an electronic circuit configuration comprising the heretofore mentioned turn signal detector, logic and timing circuitry, and a field effect switching transistor 6, having a source 7, a gate 9, and a drain 8. The configuration further comprises an accessory tab 2 and an (output) flasher tab 3.

Said accessory tab 2 and flasher tab 3 may be thought of as replacing the corresponding tabs of a flasher of the prior art.

The closing of switch 4 represents the closing of the contacts of a turn signal switch as it is moved to a detent position. Whenever gate 9 is at logic 0 with switch 4 closed, lamp 5 will light.

The turn signal switch detector 17 comprises a dropping resistor 11, comparator 15, having positive input port 13, inverting input port 14, and output port 16, and further comprising biasing element 12 and bleeder resistor 10. The resistance of 10 is considerably larger than the resistance of lamps 5 but small enough to pass enough current to keep the potential (emf) at comparator inverting terminal 14 at an acceptable value even when the filaments of lamps 5 are cold. When switch 4 is closed, the first effect is for the emf at tab 3 and at port 14 to fall to a value near ground, but not outside the common mode input range of 15, because of bleeder resistor 10. The emf on the positive port 13 is, on the other hand, always nearly equal to battery emf, but less by the drop in resistor 11. The comparator 15 therefore produces a logic 1 at 16; conversely, the inverting terminal 14 becomes slightly more positive than 13, if said turn signal switch 4 is open.

The turn signal switch detector is what allows the invention to replace directly the common flasher of the prior art and allows the use of a power F.E.T. (field effect transistor) as the main electronic switch, such that said detector produces a logic 1 at 16 even when the voltage drop from tab 2 to tab 3 may be as small as 0.01 volt. This is considered to be an improvement over the detector of U.S. Pat. No. 4,254,397, wherein at least 0.7 volt is needed to keep the corresponding switch conducting.

The invention further comprises an edged triggered flip-flop 24 (having data port 22, clocking port 23, reset port 25, and output port 26), gated oscillator 41 (having gating port 36 and output port 40), frequency divider 42 (having clock port 43, reset port 45, and output port 44), flash counter 33 (having clocking port 35, reset port 34, output port 31, and complementary output port 32), flash signal inverter 47 (having input gate 48 and output port 46, OR circuit 20 (having first and second complementary input ports 18 and 19, respectively, and output port 21), and NAND circuit 28 (having first and second gates 29 and 30, respectively, and output port 27).

When switch 4 is closed, the emf at port 16 goes to logic 1. Flip-flop 24 produces a logic 1 at port 26, causing oscillator 41 to commence producing a periodic output at port 40. Divider 42, having previously been reset by the logic 0 on port 16, via OR circuit 20, starts with a logic 0 at port 44, which means a logic 1 at port 46 of inverter 47. This logic 1, together with the logic 1 at port 26, causes NAND circuit 28 to produce a logic 0 at 27. This causes switch 6 to conduct and light lamps 5, a MARK. The dividing modulus of 42 is an integer N.

The duration of this first MARK is equal to the time it takes divider 42 to produce a logic 1 at 44. As oscillation continues, port 44 remains at logical 1, causing switch 6 to remain OFF for ½N oscillations, a SPACE. A series of alternate, uniform MARK's and SPACE's ensues until 24 is reset. Counter 33 advances once for each MARK.

The frequency of flashing for the invention is, therefore, equal to the frequency of oscillation of 41, divided by the modulus N of divider 42. The flashing sequence continues until counter 33 produces a logic 1 at port 31. Then flip-flop (F.F.) 24 is reset and OR circuit 20 also resets divider 42 and counter 33. The counter 33 therefore determines the timeout interval for the invention.

The resetting of divider 42 when F.F. 24 is reset is what causes the first MARK of a sequence to be equal in duration to subsequent MARK's. This characteristic of the invention is considered an improvement over flashers of the prior art, with several possible exceptions, notably the motorcycle flasher of UK Pat. 2,084,413A, where it appears that a divide-by-two counter helps control the duration of a first MARK.

The relatively high frequency of oscillation used in the present invention allows that frequency-determining-capacitor 38 may be N times smaller than the corresponding capacitors in the prior art; likewise the small power consumption of the F.E.T.'s of the present invention allows a minimal resort to filters for the elimination of vehicular electronic noise.

The particular circuitry of the present invention results in one more novel feature: the frequency of oscillation may conveniently be chosen to be ideal for a small audio transducer (speaker) for the purpose of supplementing each MARK with an audible tone, and the signals for this are readily available. Details are given in the DESCR. OF PRFD EMBODIMENTS.

The physical configuration of components which may be used in the present invention is not considered to require any particular innovation or skill, so that the circuit configuration as specified herein is the invention.

DESCRIPTION OF THE PREFERRED EMBODIMENTS

Figure 2:
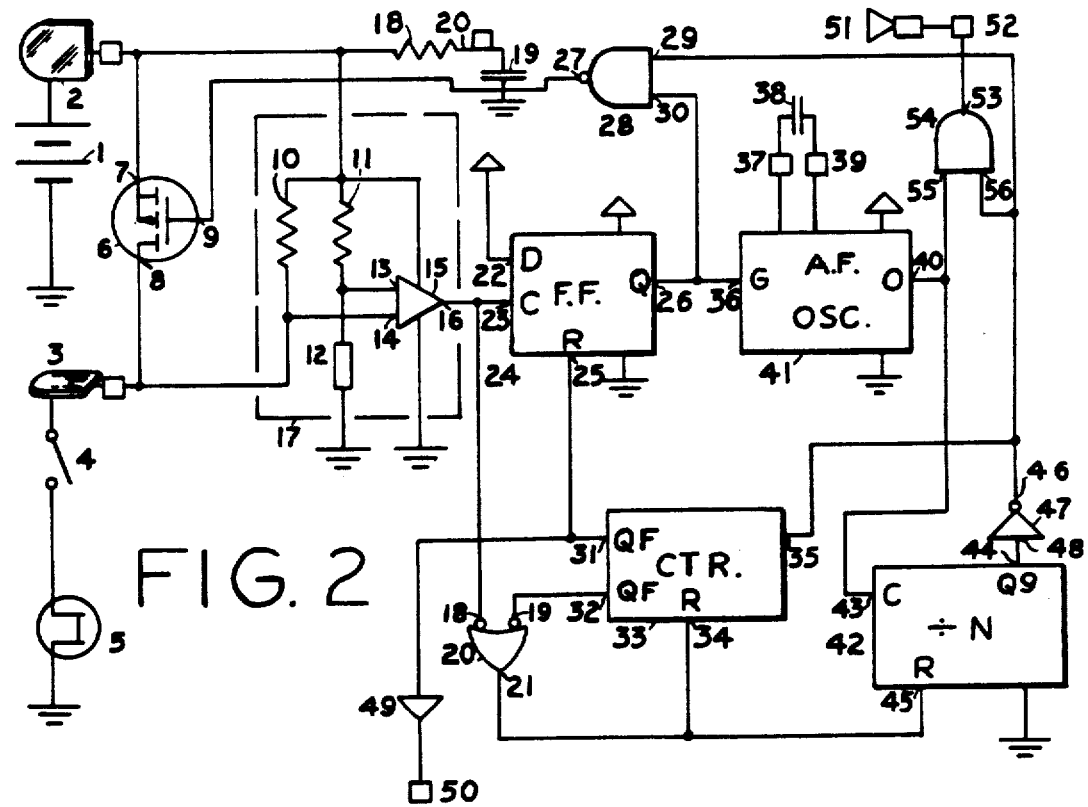
FIG. 2 is a schematic diagram of the preferred embodiment of the invention. Ancillary features are depicted.

In the preferred embodiment the elements of the invention as depicted in FIG. 2 may all be placed o a single integrated circuit chip, with the exception of tabs 2 and 3, a filter capacitor 19 and oscillator frequency determining capacitor 38. Oscillator 41 may be any of several oscillators which are readily made with F.E.T. circuitry. Said oscillator frequency may be any frequency between 16 Hz. and 6,400 Hz; said frequency divider modulus would then be at least 16 in order to provide a flashing frequency of at least one per second. Divider 42 and counter 33 may be one string of binary counting stages having nine stages to Q9 (port 44) and five more stages to QF (port 31).

The aforementioned audio transducer is part of the preferred embodiment and is represented by 51. To form the desired function AND circuit 54 having first and second gates 55 and 56 with output port 53 drives terminal 52 to which transducer 51 is connected. A beep having the frequency of oscillation of 41, is produced during each MARK.

Current biasing element 12 may be a current source, and filter element 18 may be a resistor, as shown. Net 20 is then the positive d.c. power rail for all the circuitry.

Figure 1:
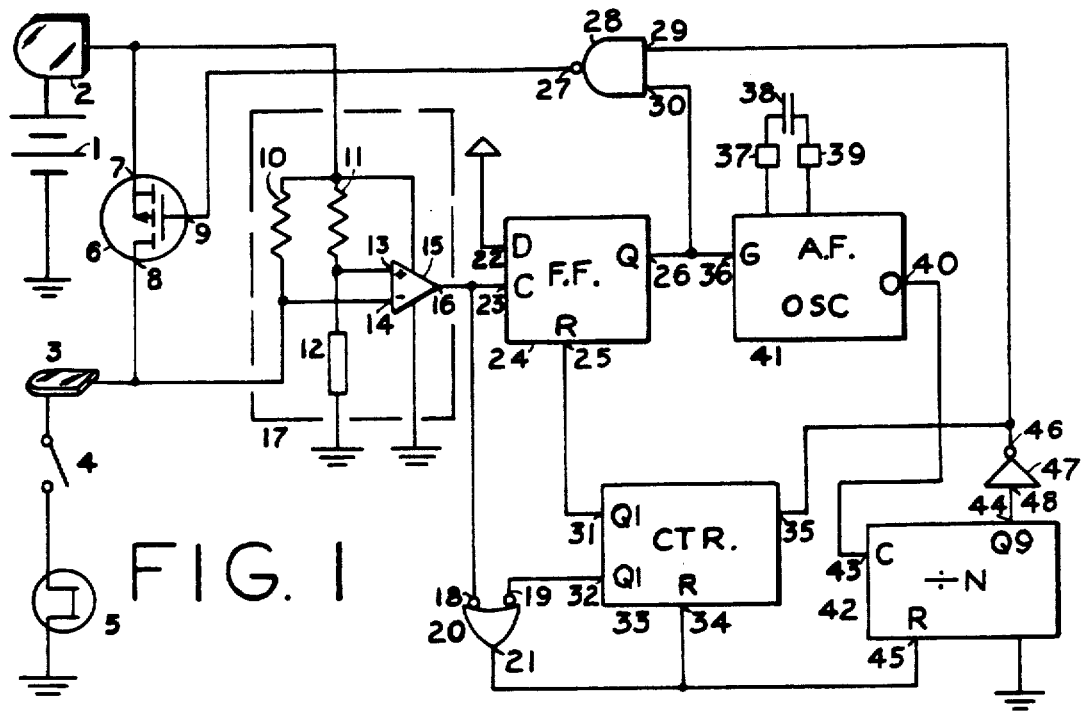
FIG. 1 is a schematic diagram of the invention showing how battery 1, turn signal switch 4, and signal lamps 5 are connected to it.

The upward pointing triangle symbolizes connection to this power rail throughout FIGS. 1 and 2. The small squares such as 37 and 39 represent chip pads for making connection to said chip.

The operation of the configuration of FIG. 2 is just as described in SUMMARY, above. Buffer 49, driving chip pad 50 allows an external solenoid switch to be synchronized with the end of a timeout interval.

In another embodiment Power F.E.T. 6 may be kept separate from said chip.

In an embodiment using discrete components, switch 6 may be a P-channel "T-MOS" F.E.T.; comparator 15 may be an operational amplifier employing junction F.E.T.'s and metal-oxide-semiconductor (MOS) F.E.T.'s.

We claim:

1. An electronic flasher-switch device, in a motorized vehicle having a turn signal switch with Left detent, Off, and Right detent positions and having left and right turn signal lamps, a direct current (d.c.) power source and a system ground, said device comprising:
   a. an accessory terminal, a flasher terminal, and a connection to said ground,
   b. a field effect transistor (F.E.T.) having a source, a gate, and a drain, wherein said source is connected to said accessory terminal, and said drain is connected to said flasher terminal,
   c. a turn signal switch detector having an input port and an output port, whereby a logic 1 is produced at said output port whenever said turn signal switch is in said Left detent position or said Right detent position,
   d. a flip-flop having a clocking port, a data port, and output port, and a reset port, wherein said clocking port is connected to said turn signal switch detector output port, and said data port is held at logic 1,
   e. an audio frequency oscillator having a gate and an output port, wherein said audio frequency oscillator gate is connected to said flip-flop output port, whereby said oscillator commences to oscillate whenever said turn signal switch is moved to said Left detent position or said Right detent position,
   f. a frequency divider having a clocking port, an output port, and a reset port, wherein said frequency divider clocking port is connected to said oscillator output port, whereby a periodic pulse train of a standard flasher frequency is produced at said frequency divider output port,
   g. an inverter having an input gate and an output port, for providing a periodic train of pulses corresponding to MARKS in said turn signal flashing sequence, wherein said inverter input gate is connected to said frequency divider output port,
   h. a counter having a clocking port, an output port, a complementary output port, and a reset port, wherein said counter clocking port is connected to said inverter output port, whereby state of said counter is advanced whenever said inverter produces each one of said MARKS,
   i. an OR circuit having first and second complementary input ports and an output port, wherein said second input port is connected to said counter complementary output port, and said first input port is connected to said turn signal switch detector output port, whereby, when said counter reaches a predetermined flash count, or when said turn signal switch is in said Off position, said counter and said divider are both reset,
   j. a NAND circuit having first and second gates and an output port, wherein said first NAND gate is connected to said inverter output port, and said second NAND gate is connected to said flip-flop output port, and said NAND output port is connected to said field effect transistor gate, so that when said turn signal switch is in said Left detent position or said Right detent position beyond said predetermined count, said signal lamps stop flashing.

2. The electronic device of claim 1, further comprising an AND circuit having first and second gates and an output port, wherein said first AND gate is connected to said oscillator output port and second AND gate is connected to said inverter output port, and a speaker element connected to said AND output port, so that an audible tone is produced when said inverter produces each one of said MARKS.

3. The electronic device of claim 1, further comprising a buffer circuit connected from said counter output port to a terminal for external access, where a timeout pulse is generated by said counter.

4. The electronic device according to claims 1, 2, or 3, wherein the frequency of said oscillator is between 16 and 6,400 Hz, and the dividing modulus of said frequency divider is at least 16.

5. The electronic device according to claims 1, 2, or 3, wherein said turn signal switch detector comprises a comparator having positive and inverting input ports and an output port, a dropping resistor connected from said accessory terminal to said positive input port, a biasing means connected from said positive input port to said system ground, and a bleeder resistor connected from said accessory terminal to said inverting input port.

* * * * *